United States Patent
Tornga (10) Patent No.: US 8,245,755 B2
(45) Date of Patent: Aug. 21, 2012

(54) TUBELESS TIRE CHANGING SYSTEM USING A PSEUDO AXLE

(76) Inventor: Charles Edward Tornga, Bel Air, MD (US)

( * ) Notice: Subject to any disclaimer, the term of this patent is extended or adjusted under 35 U.S.C. 154(b) by 329 days.

(21) Appl. No.: 12/658,305

(22) Filed: Feb. 11, 2010

(65) Prior Publication Data
US 2010/0212838 A1 Aug. 26, 2010

Related U.S. Application Data

(60) Provisional application No. 61/207,512, filed on Feb. 13, 2009.

(51) Int. Cl.
*B60C 25/02* (2006.01)
(52) U.S. Cl. .......................... 157/1.3; 157/1.1
(58) Field of Classification Search ............ 157/1.17, 157/1.2, 1.22, 1.24, 1.3, 11, 14
See application file for complete search history.

(56) References Cited

U.S. PATENT DOCUMENTS

| | | | | |
|---|---|---|---|---|
| 3,818,967 A * | 6/1974 | Dunn | ........................ | 157/1.22 |
| 3,867,975 A * | 2/1975 | Johnson | ........................ | 157/1.2 |
| 3,905,413 A * | 9/1975 | Myers | ........................ | 157/1.24 |
| 3,911,989 A * | 10/1975 | Vandenburg | ........................ | 157/1.24 |
| 4,360,052 A * | 11/1982 | Norris | ........................ | 157/1.3 |
| 4,461,335 A * | 7/1984 | Beemer | ........................ | 157/1.22 |
| 4,756,354 A * | 7/1988 | Callas | ........................ | 157/1.3 |
| 4,896,712 A * | 1/1990 | du Quesne | ........................ | 157/1.24 |
| 4,995,439 A * | 2/1991 | Burge | ........................ | 157/1.17 |
| 5,740,848 A * | 4/1998 | Goracy | ........................ | 157/1.3 |
| 6,273,171 B1 * | 8/2001 | Kliskey | ........................ | 157/1.22 |
| 7,628,193 B1 * | 12/2009 | Tart, Jr. | ........................ | 157/1.3 |
| 2003/0066613 A1 * | 4/2003 | Bishop | ........................ | 157/1.28 |
| 2007/0235145 A1 * | 10/2007 | Levin et al. | ........................ | 157/1.22 |

* cited by examiner

*Primary Examiner* — David B Thomas (57) ABSTRACT

An assembly for mounting and demounting tires from wheels with a hollow cylinder hub such as motorcycle wheels composed of a wall mounting base on a frame with a spindle that projects perpendicular to the wall and a removable mount/demount bar. A wheel hub is mounted on the spindle. The mount/demount bar is fixed in place at the end of the spindle so as to resist rotational force in a vertical plane. With demount bar tool head positioned for levering the tire off the rim or forcing it onto the rim the wheel is turned on the spindle. The tool may be wall mounted for space-efficient operation and allows the wheel to be balanced on the spindle by allowing the wheel to spin freely on its own bearings.

5 Claims, 7 Drawing Sheets

TUBELESS TIRE CHANGING SYSTEM USING A PSEUDO AXLE

CROSS REFERENCE TO RELATED APPLICATIONS

Not Applicable, however reference is made to Provisional Application No. 61/207,512 filed Feb. 13, 2009.

FEDERALLY SPONSORED RESEARCH OR DEVELOPMENT

Not Applicable. No rights to these inventions result from federally sponsored research and development. These inventions have been made without any federally sponsored research and development.

REFERENCE TO A SEQUENCE LISTING, A TABLE OR A COMPUTER PROGRAM LISTING COMPACT DISC APPENDIX

Not Applicable.

BACKGROUND OF THE INVENTION

This invention relates to tools, and more particularly to motorcycle tire changers. Specifically, it relates to such tire changers as are manually operated. The earliest commercially produced vehicle tires were simple in construction. Tires have become increasingly complex over time with the introduction of tubeless tires with new compounds and belting materials. These changes resulted in stiffer tire sidewalls that greatly resist the stretching of sidewalls required for the mounting and demounting of tires.

The earliest tires could easily be mounted on wheel rims using simple levers commonly referred to as spoons. Many improvements have been made to the tire changing tools art, but most have been focused on the larger market of car and truck tires and wheels which are significantly different than motorcycle tires and wheels. The vast majority of existing tools available for changing tubeless motor vehicle tires may be categorized within three basic technologies.

The first and original category is the tire iron, often referred to as a spoon. Tire irons are simple bars used manually as a lever to urge a tire wall over a tire rim. Mounting and demounting tubeless tires using tire irons is a very difficult and time-consuming task that can easily damage tires and wheels.

The second category of tool is the tire-changing pedestal that locks a wheel horizontally onto a base so that a mounting/ demounting lever can be rotated around the rim to separate the old tire and install the new tire. A variation on this tire changing pedestal is a system that locks onto the tire rim and spins the tire while an external fixed mounting/demounting lever removes the old tire and installs the new tire. The tire changing pedestals must be firmly attached to a floor or solid surface by bolts or similar means, and require a significant amount of space for operation. Tire changing pedestals have the advantage of firmly holding a wheel in place while performing the tire changing operation; however the heavy weight of these systems makes them difficult to install or move. They also require over 25 square feet of floor space for convenient operation. The large size and heavy weight of tire changing pedestals makes them too bulky and expensive to be practical for most non-commercial applications.

A third category of the technology which includes the present invention falls between the previously mentioned technologies. This third category involves manually operated tools that either require the wheel to be mounted a on a base plate or frame or require that an axle or spindle be inserted into the wheel hub to act as a fulcrum against which mount/ demount arms may be rotated to mount or dismount a tire.

Previous attempts to address the need for a manual tire mount/demount mechanism are represented by patent publication number US 2003/0066613 A1 dated Apr. 10, 2003, U.S. Pat. No. 5,740,848 dated Apr. 21, 1998, U.S. Pat. No. 3,818,967 dated Jun. 25, 1974 and U.S. Pat. No. 3,818,967 dated December 2009.

Patent 2003/0066613 A1 has the disadvantages that it requires that a wheel be affixed to a base plate, that a drive mechanism be provided, and that a separate receiver be provided for a bead rolling tool, and it does not provide a mechanism for balancing wheels.

U.S. Pat. No. 5,740,848 has the disadvantages that it requires that a wheel be fitted with a tire rim engager comprised of a disc and a detachable ring for fitting the tool to a wheel, it does not provide a wheel holding mechanism for countering the force of the mount/demount lever and therefore requires an additional force to hold the wheel in place, and it does not provide a device for balancing wheels.

U.S. Pat. No. 3,818,967 claims that "[S]ubstantially balanced, opposite rotational forces" make the invention self stabilizing but does not provide a wheel holding mechanism for countering the force of the cranking handle therefore it requires an additional force to hold the wheel in place, it introduces a second counter rotating tool head arm which increases resistance relative to a single tool head of conventional tire mounting devices, and it does not provide a device for balancing wheels.

U.S. Pat. No. 7,628,193 claims a tire mounting device composed of a base, a centerpiece, and a class 1 primary lever movable relative to the centerpiece. It is an adaptation of a traditional pedestal mounted tire changer. It utilizes a class 1 lever as a separate moving part. Operation of the primary lever requires application of force on said lever at a distance from the center of the wheel greater than the radius of the wheel and tire combined, the force must be applied on said lever at 360 degrees to the center of the wheel on the plane of the wheel, and simultaneous force must be applied down toward the base of the device. Said application of force would not be feasible if the device were wall mounted. This device has the disadvantage that the centerpiece claimed would not be suitable for use with bearings mounted on the outside of the hub such as motorcycle wheels because the forces applied would cause serious damage to the bearings. This device also has the disadvantage that it does not provide device for balancing wheels as an integrated feature of the design.

BRIEF SUMMARY OF THE INVENTION

This tubeless tire changing system is composed of a wall mounted base with spindle, a mount/demount bar, and may include a wheel rotating tool for increased leverage. The purpose of the invention is to provide a tire mounting system that is simple in design, requires less space to operate, does not require permanent fixture to a floor, is easier to operate than other manual tire changing tools, and provides the spindle as a mount for static balancing rather than requiring a separate wheel balancing apparatus.

This tubeless tire changing system takes advantage of the relatively small size of motorcycle tires and take advantage of the configuration of the presence of wheel bearings mounted on the hubs of motorcycle wheels. This system uses a spindle as a pseudo axle to suspend the wheel and tire in a vertical plane. When a wheel is removed from a vehicle its axle is also removed from the hub of the wheel, however the wheel bearings remain in the wheel hub. The wheel hub is then slipped over the spindle which acts as a pseudo axle to suspend the wheel for mount/demount of tires. With the wheel mounted on the spindle a mount/demount bar is attached to the end of the spindle and locked in place. To demount a tire, the demount bar tool head is inserted between the wheel rim and the lip of the tire wall. The wheel is then spun on the spindle until one lip of the tire is separated from the rim. The process is repeated for the opposite tire wall to complete separation of the tire from the wheel. The demount bar is then rotated so that the mounting tool head faces the tire and the process is reversed to mount the new tire. The present invention is simple to produce and can be made using no moving parts once the wheel has been installed for operation. It allows for the omission of the element of a pedestal, yet it address the need for holding a wheel in a fixed position without requiring an additional force to hold the wheel in place while applying force to the tool head. It provides a wheel balancing capability thus eliminating the need for an additional wheel balancing tool, and it does not require a rim engager.

DETAILED DESCRIPTION OF THE INVENTION

The process for making this invention involves standard machine shop procedures to cut, drill, mill, thread and weld parts of hardened steel composition. It may also involve coating certain parts with non-abrasive materials to minimize the possibility of scratching or marring wheels.

This invention consists of a base that can be mounted on a wall or other flat surface, a spindle projecting from the base on an axis that is perpendicular to the wall or flat surface used as a pseudo axle to suspend the wheel and tire in a vertical plane, and a mount/demount bar with mount and demount tool heads on obverse sides of the demount bar.

Figure 1A:
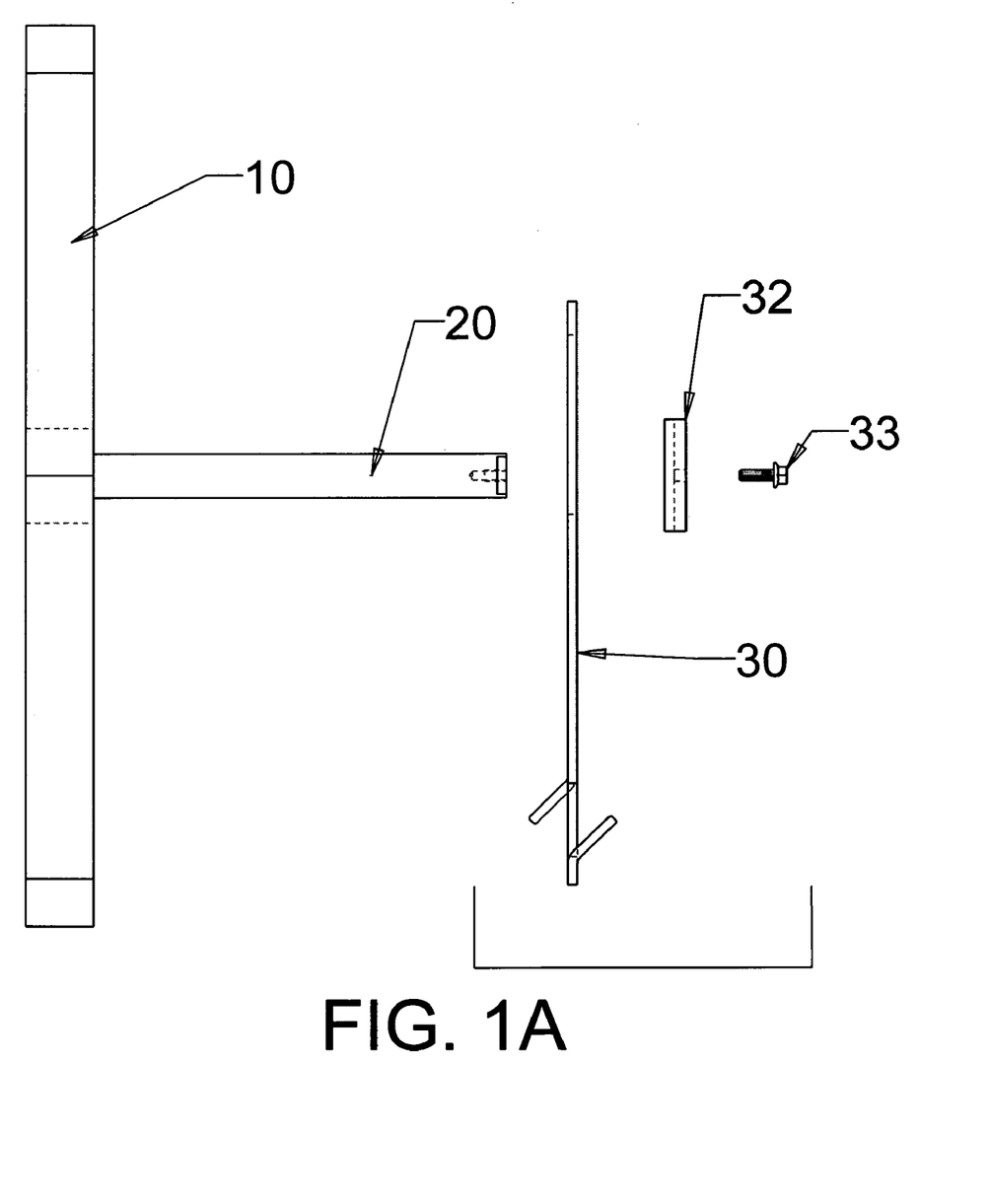
FIG. 1A depicts a side view of the base unit showing the relationship of the parts to each other prior to assembly.
Figure 1B:
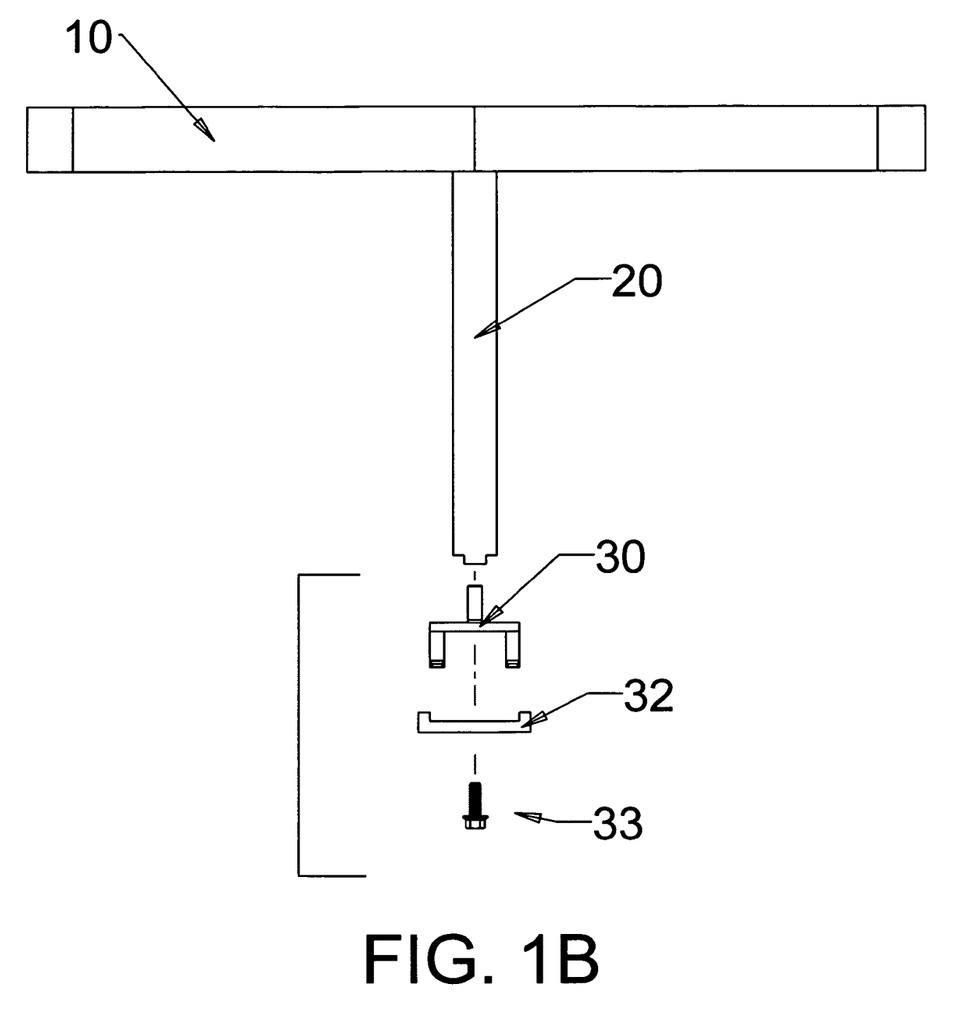
FIG. 1B depicts a top view of the base unit of FIG. 1A.
Figure 2A:
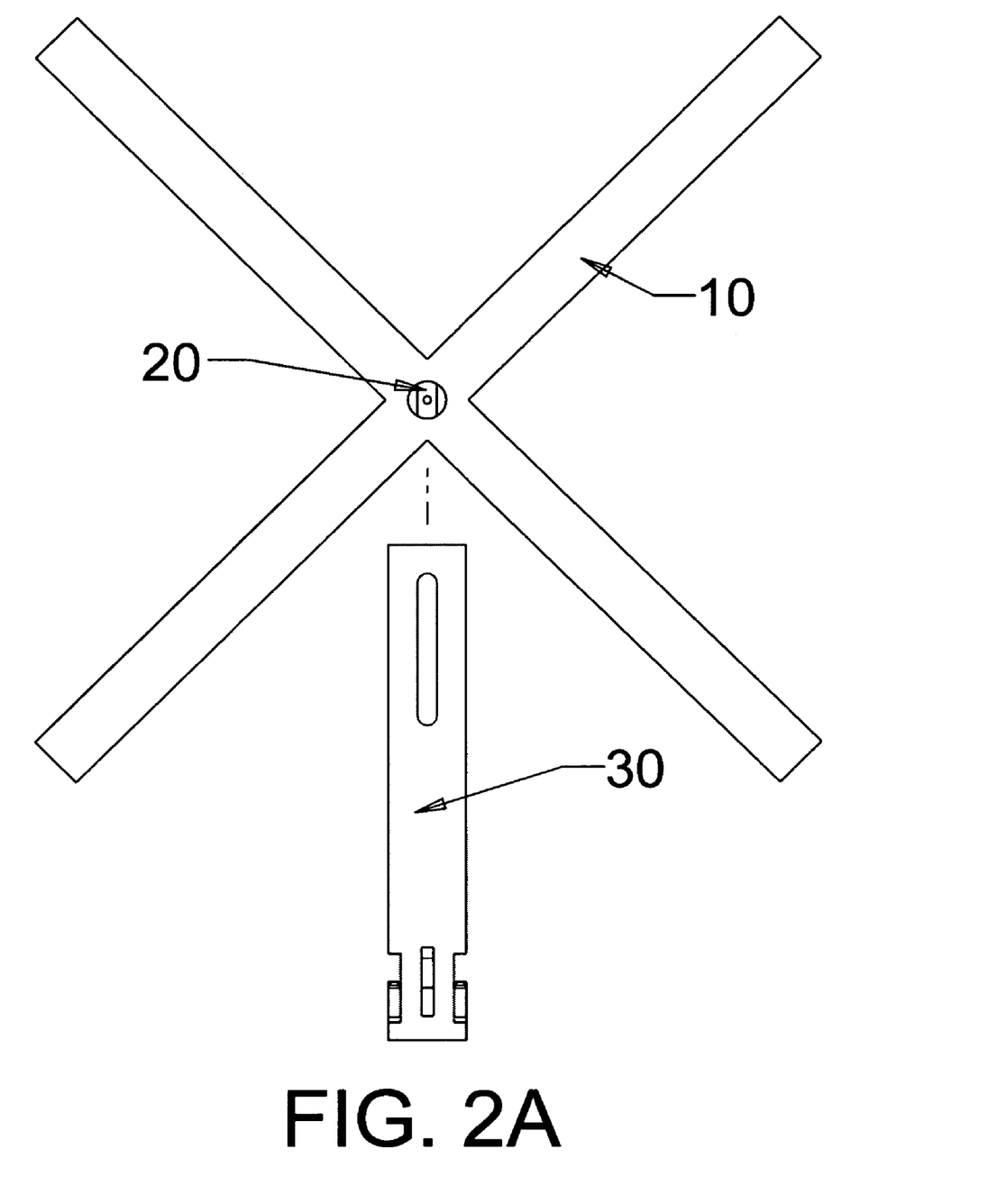
FIG. 2A depicts a front expanded view of the base unit showing the base (10), spindle (20) and mount/demount bar (30).

The base and spindle are shown in side view, top view and front view respectively in FIG. 1A, FIG. 1B, and FIG. 2A. This embodiment of the base 10 as illustrated depicts the base as constructed of box tubing, typically steel, with lengths of the box tubing material having been welded together at the center of the X shaped structure.

This embodiment of the spindle 20 as illustrated depicts one end of the spindle as being permanently welded to base 10 at the center of base 10 on an axis wherein the spindle 20 is perpendicular to the base 10 with the parallel flat faces, along the lateral surface of the spindle 20 opposite the weld of spindle 20 to base 10. Alternate embodiments of spindle 20 may replace the parallel flat surfaces of spindle 20 channels or spline. The attachment of spindle 20 to base 10 by welding or other rigid method ensures that spindle 20 will not rotate or otherwise move on base 10 when torsional force is applied to spindle 20.

Figure 2B:
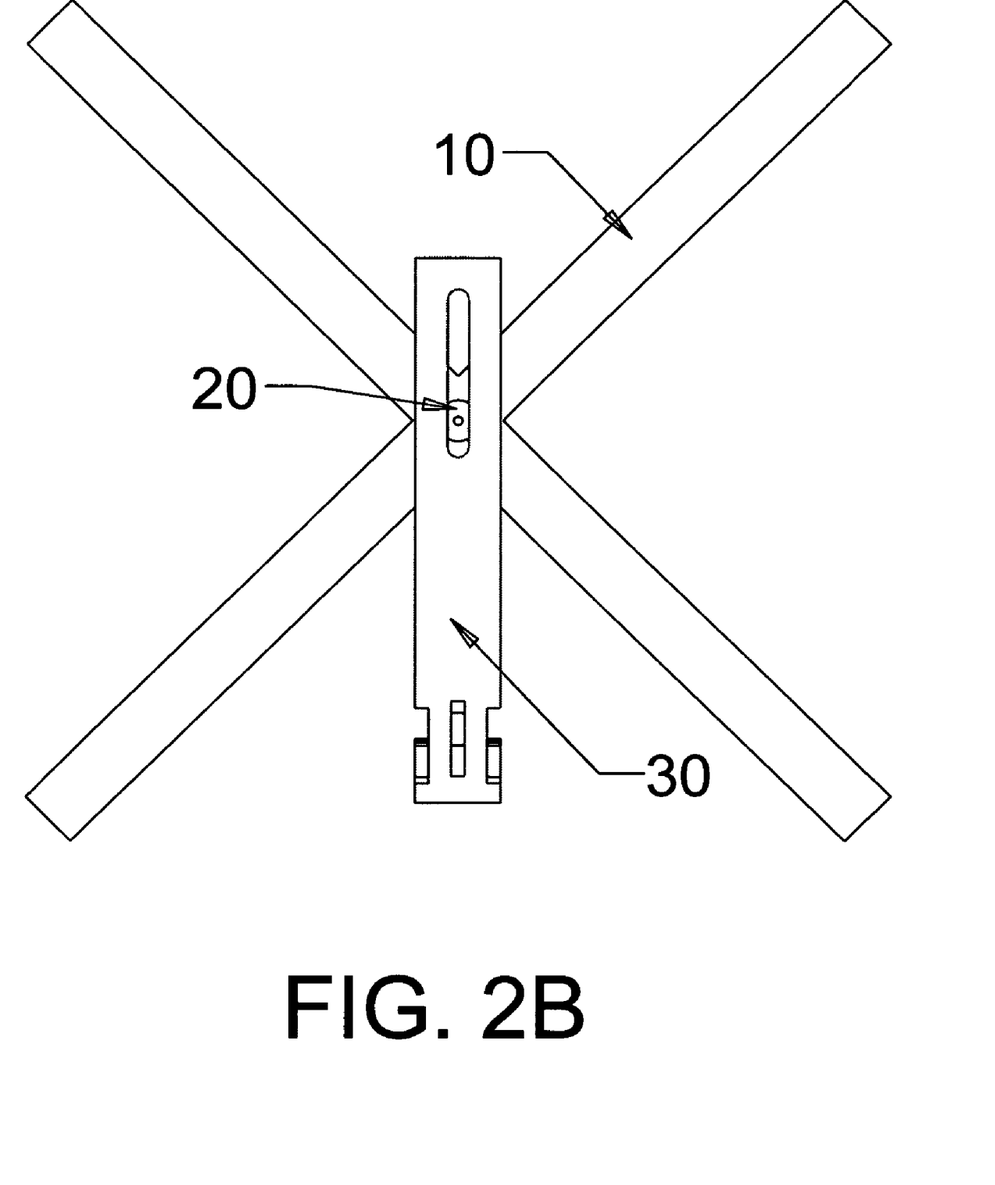
FIG. 2B depicts a front view of the invention showing the base (10), spindle (20) and mount/demount bar (30) in assembled position prior to locking the mount/demount bar on the spindle.
Figure 3A:
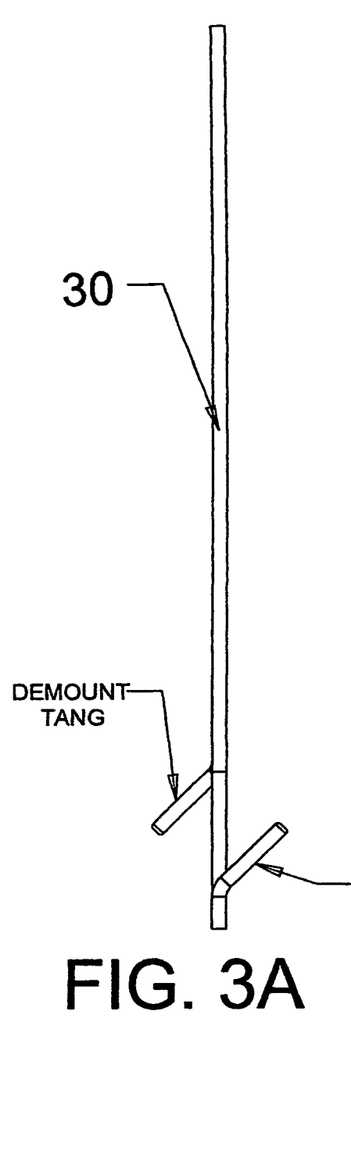
FIG. 3A depicts the mount/demount bar (30) in side view.
Figures 3B, 3C:
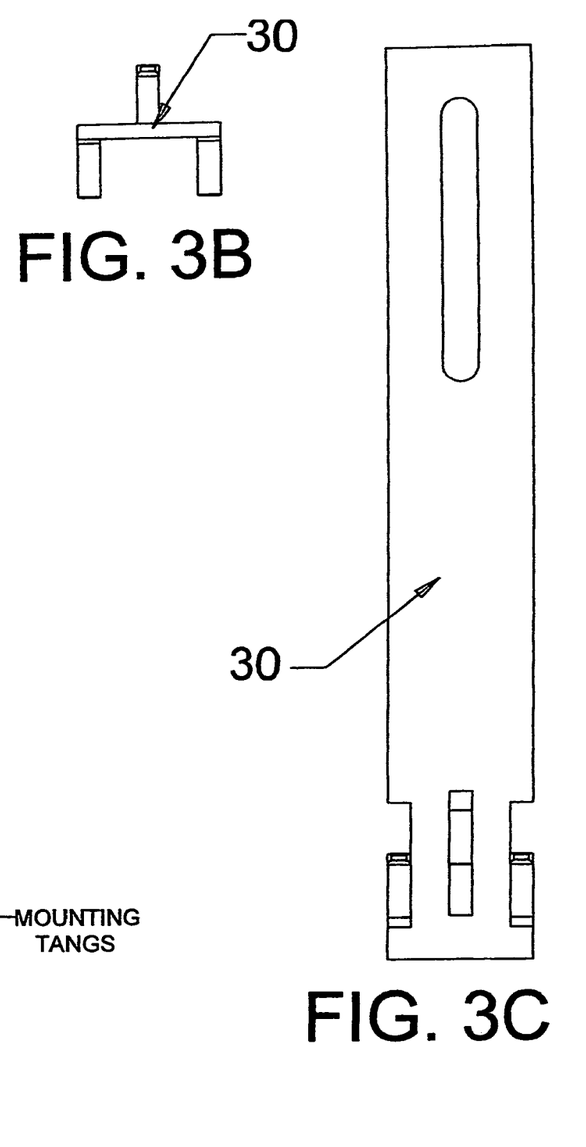
FIG. 3B is an end view of the mount/demount bar of FIG. 3A.
FIG. 3C is a top view of the mount/demount bar of FIG. 3A.
Figure 4A:
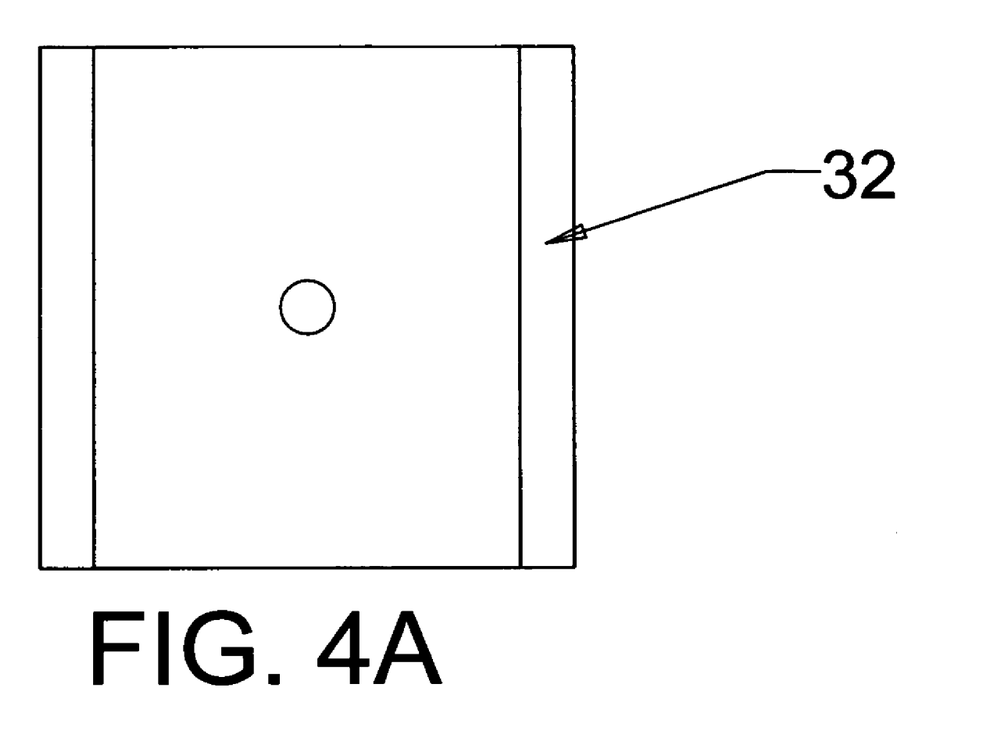
FIG. 4A depicts the optional locking collar (32), in front view.
Figure 4B:
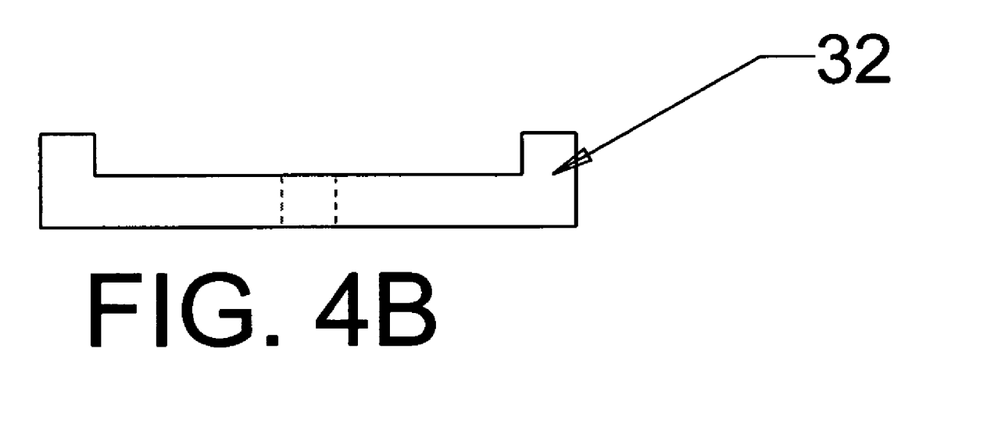
FIG. 4B is a top view of FIG. 4A.
Figure 5:
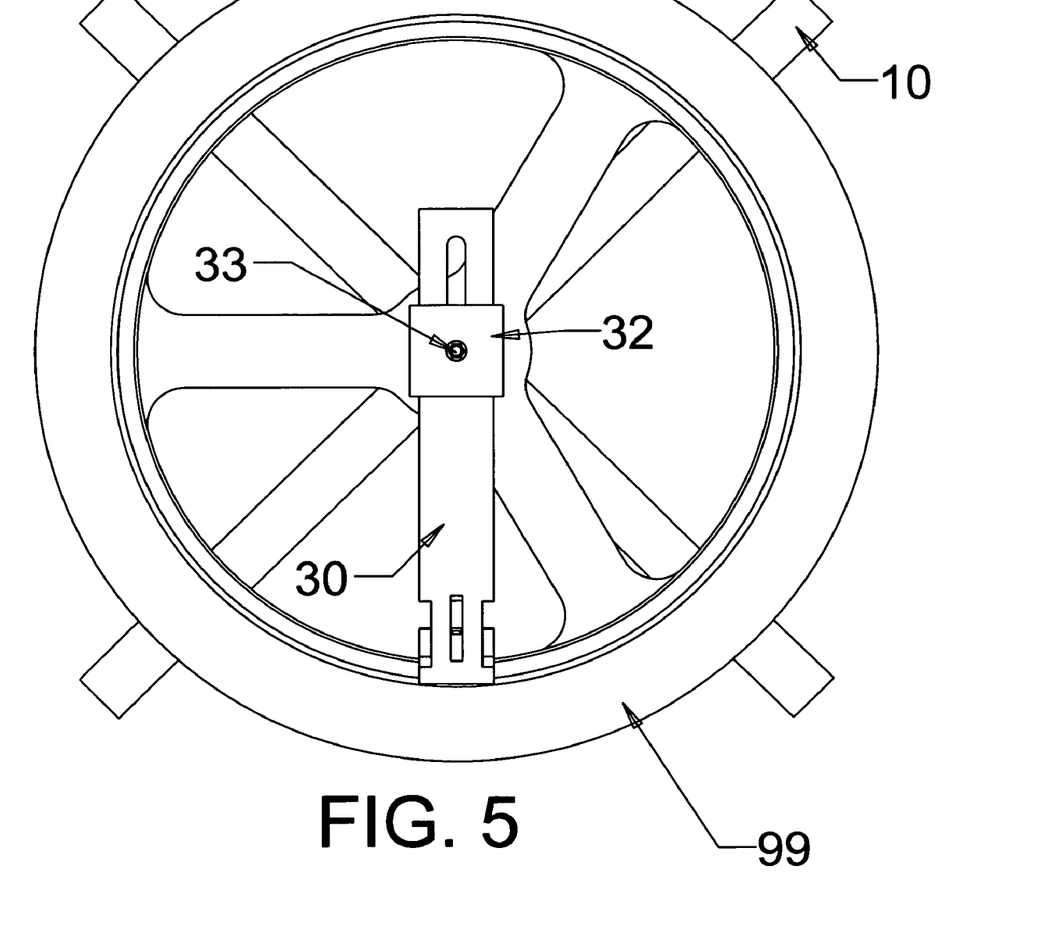
FIG. 5 depicts an assembled view of the invention with a wheel (99) mounted on the spindle to illustrate the invention as it will be used.

FIGS. 3A-3C illustrate the mount/demount bar 30. FIG. 3C displays an elongated slot through the upper porting of mount/demount bar 30. Said elongated slot is cut by means of milling or other machining process at a width sufficient to allow the passage of the male parallel flat faces of spindle 20 to be passed through the female elongated slot of demount bar 30 when aligned with mount/demount bar 30 as illustrated in FIGS. 2A and 2B. A tight tolerance of the fit between the male parallel flat faces of spindle 20 to the female elongated slot of mount/demount bar 30 when aligned with mount/demount bar 30 as illustrated in FIG. 2B ensures that when force exerted on mount/demount bar 30 creates torsional force onto spindle 20 that said torsional force is resisted. Said slot of mount/demount bar 30 is elongated to allow adjustment for variance in radius between different wheels.

Alternate embodiments of mount/demount bar 30 may replace the parallel flat surfaces of spindle 20 with channels or spline for mating spindle 20 to mount/demount bar 30.

To operate this invention the wheel hub is mounted on the spindle. With the wheel mounted on the spindle, the demount bar tool head is inserted between the wheel rim and the lip of the tire wall and the opposite end of the mount/demount bar is attached to the spindle in such a way that it is locked in place to resist rotation in the vertical plane. An optional locking collar may be used, and a bolt, nut or pin may be used to affixed the mount/demount bar to the end of the spindle. With demount bar tool head positioned for levering the tire off the rim or forcing it onto the rim the wheel is turned on the spindle. The wheel is rotated on the spindle until the tire lip is separated from the rim. To mount a new tire on the rim the mount/demount bar is reversed so that the mounting tool head is facing the wheel and the process is repeated. The tire changing system may also include a wheel rotating tool for increased leverage. This invention uses the structure of a motorcycle wheel hub to allow the wheel to spin on its own bearings in a vertical plane on a pseudo axle. An unexpected benefit of this arrangement is that it further allows the eccentric weight of the wheel to be balanced by allowing the wheel to spin freely on its own bearings, and counterbalancing the heavier portion of the wheel that settles to the bottom of the circle of rotation by attaching balancing weights. This capability eliminates the need for a separate wheel balancing apparatus.

There are no other tire changing systems available that take full advantage of the hollow hub structure of a motorcycle wheel, use a spindle for holding the wheel in place to eliminate movement of the wheel while applying force to the mount/demount tool head, and use a wheel pseudo axle as a fixed mount for the mount/demount bar.

Advantages and New Features. One advantage of the invention is that the work space required to change a tire using this tool is significantly less than that required for other types of tire changers. It does not require a table, floor surface, floor mounted frame or trailer hitch to steady the tire and wheel while forces are applied to separate the tire from the rim.

A second advantage is the simplicity of this tool. Its primary parts consists only of a base with spindle and a mount/demount bar and bolt. This is the simplest tool design possible for bracing both the wheel and the tool used to lever the tire on and off of the wheel rim while mounting a tire.

A third advantage is that the spindle can also be used as a balancing mount. Since most motorcycle wheels come with a bearing on each side of the axle hub, the wheel may be balanced using the spindle as a static balancing tool with which the wheel is snugly fitted to the spindle, and the heavy section of a wheel will rotate to the bottom and counterweights can be added to the top portion of the wheel until balance is achieved. This is a new and unexpected result of creating the wall mounted spindle for supporting the wheel during the tire changing process.

A fourth advantage is that the wheel is braced in a plane on the spindle while counterforce is applied to the wheel and tire without the use of clamping mechanisms. Bracing the wheel significantly reduces the effort required for separation or mounting and is required in some form for all types of tire changing methods. Various methods of bracing wheels in place involve clamps that may mar the wheel, allow the wheel to slide within the clamping device while exerting counterforce on the wheel, or may deform the wheel from extreme clamping pressure. Wall mounting the tire changing tool and fitting the wheel so that it can spin freely on the spindle eliminates the need for the wheel rim to be clamped in position. This greatly diminishes the probability of damaging the wheel or tire.

A fifth advantage is that this system can be mounted on the inside wall of an enclosed trailer for use at special events. Hauling motorcycles to such events requires that trailers be large enough to contain the motorcycles, but be as small as possible to reduce the trailer cost and reduce the load on the tow vehicle. This invention allows a traveler to take a tire changing tool to a motorcycle track event where tires are frequently changed and replace and balance tires quickly and easily with a minimum amount of space being dedicated to tire changing equipment.

Alternatives. This tire-changing system is designed predominantly for the changing of motorcycle tires, but can be adapted for use with other wheels having a hollow center and containing bearings in the hub. The demount bar may be interchangeably configured with variously shaped distal ends for mounting the tires on the wheel rim or removing the tire from the wheel rim. Various spacers, shims and collets may be added to allow fitment of varying diameter or width of wheel hubs. A wheel wrench may be used to allow the operator to gain leverage to turn the wheel against the resistance of the demount tool. The system may be mounted on a horizontal plane for mounting and demounting operation. The mating of spindle to mount/demount bar may be alternately configured with channel, spline or other method such that the mount/demount bar resists rotational force on the axis of the spindle in the plane parallel to the wall.

Numerous characteristics and advantages have been set forth in the foregoing description, together with details of structure and function. The novel features are pointed out in the appended claims. The disclosure, however, is illustrative only, and changes may be made in detail, especially in matters of shape, size, and arrangements of parts, within the principle of the invention, to the full extent indicated by the broad general meaning of the terms in which the general claims are expressed.

The invention claimed is:

1. A system for mounting and demounting motorcycle tires to/from wheel rims comprising: a mounting base suitable for mounting the device to a wall or other surface; a spindle configured to attach to said base such that said spindle will project perpendicular to the wall or other surface when said base is attached to a wall or other surface; and a removable mount/demount bar that can be fixed in place by fastener such as nut, bolt or pin at the end of said spindle in such a manner as to resist rotational force on the axis of said spindle in a plane parallel to said wall or other mounting surface.

2. The system of claim 1, wherein said mounting base includes an X shaped structure with holes whereby said base can be mounted to a wall or other surface using bolts or other fastening devices.

3. The system of claim 1, wherein said spindle is in the form of a cylindrical rod or tube that is affixed at one end of said rod or tube by weld or other inflexible means of attachment to the center of said X shaped base and perpendicular to the plane of said base, the opposing end of said cylindrical rod or tube having parallel flat faces along the lateral surface; a threaded hole or threaded bolt along the axis of said cylinder rod or tube on the end of said cylindrical rod or tube opposing the base whereby the parallel flat faces along the lateral surface of the spindle comprise a male mounting location for said mount/demount bar.

4. The system of claim 1, wherein the removable mount/demount bar comprises a flat bar having near one end of said bar an elongated slot through said bar as a female mounting location of mount/demount bar to said spindle, being centered on the width of said bar contoured for mating on parallel flat faces of the spindle; at the opposing end of said bar a hook-like projection whereby when said hook-like projection has engaged a rim and rotational force is applied to a wheel and tire said hook-like projection guides the lip of a tire over the edge of a wheel rim for mounting or demounting of a tire.

5. The system of claim 4, wherein said spindle includes a bolt or nut for securing said female slot of mount/demount bar to end of said cylindrical rod or tube.

* * * * *